United States Patent
Gros et al.

(10) Patent No.: US 9,481,428 B2
(45) Date of Patent: Nov. 1, 2016

(54) DYNAMOMETRIC CYCLE PEDAL

(71) Applicant: Commissariat à l'Energie Atomique et aux Energies Alternatives, Paris (FR)

(72) Inventors: Jean-Philippe Gros, Le Fontanil Cornillon (FR); Sébastien Brulais, Saint Martin d'Hères (FR); Ghislain Despesse, Grenoble (FR)

(73) Assignee: Commissariat a l'energie atomique et aux energies alternatives (FR)

( * ) Notice: Subject to any disclaimer, the term of this patent is extended or adjusted under 35 U.S.C. 154(b) by 0 days.

(21) Appl. No.: 14/564,939

(22) Filed: Dec. 9, 2014

(65) Prior Publication Data
US 2015/0158549 A1 Jun. 11, 2015

(30) Foreign Application Priority Data
Dec. 10, 2013 (FR) .................................... 13 62326

(51) Int. Cl.
*B62M 3/08* (2006.01)
*G01L 5/22* (2006.01)
*G01L 3/24* (2006.01)

(52) U.S. Cl.
CPC ........ *B62M 3/08* (2013.01); *G01L 3/24* (2013.01); *G01L 5/225* (2013.01); *B62K 2207/00* (2013.01); *Y10T 74/2168* (2015.01)

(58) Field of Classification Search
CPC ......... B62M 3/08; B62M 6/50; G01L 5/225; G01L 3/24; B62K 2207/00; Y10T 74/2168
See application file for complete search history.

(56) References Cited

U.S. PATENT DOCUMENTS

| | | | | |
|---|---|---|---|---|
| 4,791,813 A | * | 12/1988 | Kiffe | ................ G01L 3/24 73/379.07 |
| 8,844,404 B2 | * | 9/2014 | Chen | ................ B62M 3/08 74/594.4 |
| 2014/0297070 A1 | * | 10/2014 | Gros et al. | ............... B62M 6/50 701/22 |

FOREIGN PATENT DOCUMENTS

| | | | |
|---|---|---|---|
| CN | 201189940 | 2/2009 | |
| EP | 2072387 A1 | 6/2009 | |
| EP | 2514663 A1 | 10/2012 | |
| FR | 2878328 A1 * | 5/2006 | ............. A63B 69/16 |
| FR | 2965351 A1 * | 3/2012 | ............. B62M 6/50 |
| FR | WO 2012038677 A1 * | 3/2012 | ............. B62M 6/50 |
| WO | 2009083787 A1 | 7/2009 | |
| WO | 2012038677 A1 | 3/2012 | |
| WO | 2012059812 A1 | 5/2012 | |

OTHER PUBLICATIONS

Michael Grunfeld, "International Search Report" of corresponding French application 13/62326, Aug. 20, 2014, Published in: FR.

\* cited by examiner

*Primary Examiner* — Thomas Diaz
(74) *Attorney, Agent, or Firm* — Kaplan Breyer Schwarz & Ottesen, LLP

(57) ABSTRACT

A bicycle pedal including a tube, assembled to freely rotate around an axis, and a pedal body including at least one first surface on which a cyclist is capable of exerting an effort, the pedal body being connected to the central tube by at least one connecting member including a first portion interposed between the tube and the first surface and fitted with at least one deformation gauge.

27 Claims, 5 Drawing Sheets

DYNAMOMETRIC CYCLE PEDAL

This application claims the priority benefit of French Patent application number 13/62326, filed on Dec. 10, 2013, the contents of which is hereby incorporated by reference in its entirety to the maximum extent allowable by law.

BACKGROUND

The present disclosure relates to a dynamometric cycle pedal used to measure the efforts applied by a cyclist on the pedal during the pedaling.

DISCUSSION OF THE RELATED ART

Dynamometric pedals enable to study the different pedaling variables such as the frequency, the output power, the forces applied by the cyclist's lower limbs, the mechanical efficiency. Output power means the amount of energy provided by the cyclist per time unit, effectively taking part in setting the bicycle to motion. In particular, knowing, at any time, the output power may help cyclists optimize their performance. It enables them in particular to better manage their effort and their pedaling motion, during training or in a race.

Publication FR 2878328 describes a dynamometric pedal where the pedal comprises a pedal body formed of an upper part provided with means for fastening a cyclist's shoe and with a lower part comprising a housing receiving a pedal axis connected to a pedal crank. The upper and lower parts of the pedal body are separated from each other by an interstice and connected to each other by vertical connecting members fitted with deformation gauges capable of measuring the transverse efforts applied to the pedal.

A disadvantage of such a dynamometric pedal is that it does not enable to use conventional effort sensors, particularly effort sensors present in bathroom scales, which have many advantages. Indeed, their operating characteristics are well controlled and have benefited from a long development. Further, such sensors are manufactured at a very large scale and at a small cost. However, such conventional effort sensors are too bulky to be used as such to form the vertical connecting members of the dynamometric pedal described in publication FR 2878328.

It is thus necessary to design a specific effort sensor having a small size, each sensor being formed of one of the vertical connecting members having the deformation gauge fastened thereto. The cost of developing and manufacturing a specific effort sensor limits the use of such a dynamometric pedal to the field of high-level professional cycling. Further, the use of an effort sensor of small size in a cycle pedal may be difficult. Indeed, edge effects may appear, particularly in the form of an inhomogeneity of the deformation of the connecting member under the deformation gauge, which may distort measurements. Further, the efforts applied by the cyclist may be significant as compared with the dimensions of the effort sensor. The relative deformations of the connecting member may then be significant, so that the effort sensor may operate outside of its linear operating range, which complicates the processing of the measured signal.

SUMMARY

Thus, an embodiment of the present invention provides a dynamometric cycle pedal overcoming all or part of the disadvantages of existing solutions.

Another embodiment provides dynamometric cycle pedal which is less complex and less expensive than existing solutions.

An embodiment allows a dynamometric pedal to accurately measure the efforts exerted by a cyclist on the pedal.

Thus, an embodiment provides a bicycle pedal comprising a tube, assembled to freely rotate around an axis, and a pedal body comprising at least one first surface on which a cyclist is capable of exerting an effort, the pedal body being connected to the central tube by at least one connecting member comprising a first portion interposed between the tube and the first surface and fitted with at least one deformation gauge.

According to an embodiment, the deformation gauge extends, at rest, parallel to the first surface.

According to an embodiment, the connecting member is in contact with the tube along a first surface symmetrical with respect to a plane containing the rotation axis of the tube.

According to an embodiment, the connecting member is connected to the tube by at least one screw having its shaft crossing the rotation axis of the tube.

According to an embodiment, the connecting member is in contact with the tube along a second surface symmetrical with respect to a plane containing the rotation axis of the tube, the first and second surfaces being aligned parallel to the rotation axis.

According to an embodiment, the pedal body comprises a first part and a second part, fastened to the first portion, the tube being arranged between the first and second parts, the first and second parts being separated from the tube by an interstice.

According to an embodiment, the first portion comprises a first planar region and the connecting member comprises a second planar region, the first planar region being in planar contact against the second planar region.

According to an embodiment, the pedal body comprises a second surface parallel to the first surface, the second part comprises a third planar region, and the connecting member comprises a fourth planar region, the third planar region being capable of coming into planar contact against the fourth planar region.

According to an embodiment, the first portion comprises a central part and a frame, the frame at least partially surrounding the second portion, the second portion being fastened to the central part.

According to an embodiment, the central part and the frame belong to a monolithic part.

According to an embodiment, the connecting member comprises a second ring-shaped portion surrounding the first portion and connected to a first end of the first portion.

According to an embodiment, the pedal comprises at least two connecting members, each connecting member comprising a first portion fitted with at least one deformation gauge extending, at rest, parallel to the first surface, the two connecting members being aligned along an axis parallel to the rotation axis.

According to an embodiment, the connecting member comprises third and fourth portions parallel to the first portion and connected to a second end of the first portion opposite to the first end, the first portion extending between the third and fourth portions, the third and fourth portions being fastened to the tube.

According to an embodiment, the pedal comprises a data processing circuit capable of receiving signals delivered by said deformation gauge.

According to an embodiment, the pedal comprises means for measuring at least one acceleration of the pedal.

According to an embodiment, the pedal comprises means for measuring the inclination angle of said surface.

The foregoing and other features and advantages will be discussed in detail in the following non-limiting description of specific embodiments in connection with the accompanying drawings.

DETAILED DESCRIPTION

Figure 1:
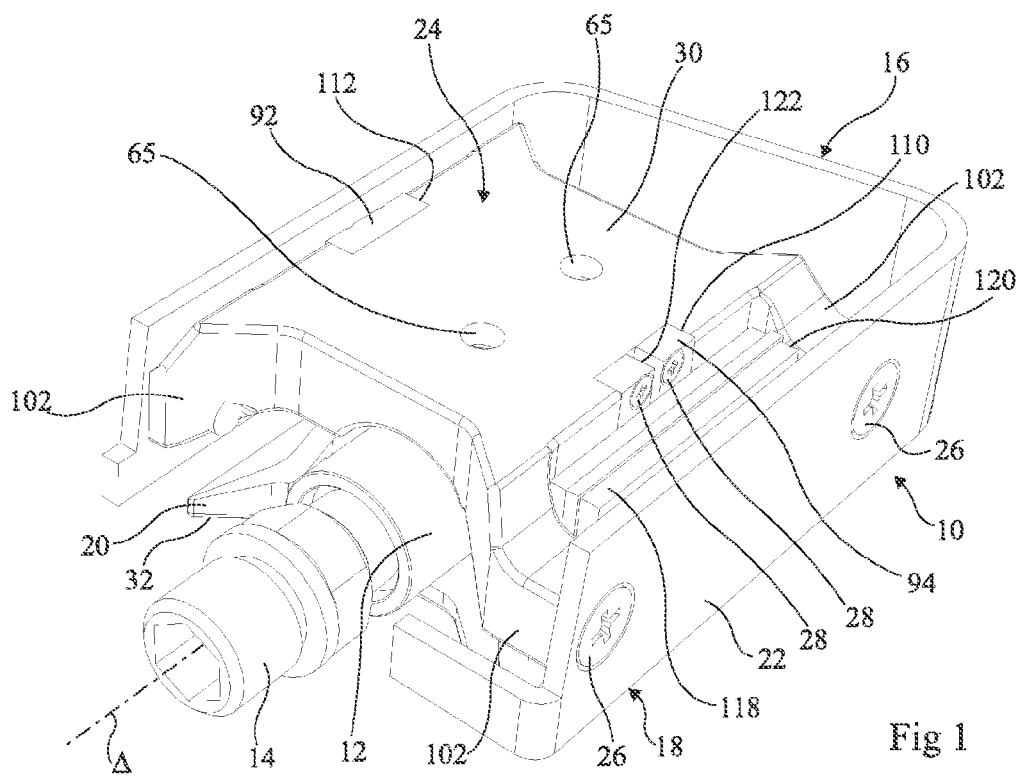
FIG. 1 is a perspective view of an embodiment of a dynamometric pedal of a cycle.

The same elements have been designated with the same reference numerals in the different drawings, which have been drawn out of scale. For clarity, only those steps and elements which are useful to the understanding of the invention have been shown and are described. In particular, the forming of the other parts of a cycle crank gear has not been detailed, the invention being compatible with any current crank gear manufacturing.

According to an embodiment, the dynamometric pedal comprises a conventional effort sensor comprising a proof body having one or a plurality of deformation gauges, generally having a side length of a few centimeters and a thickness of a few millimeters, fastened thereto. These for example are effort sensors of the type used in bathroom scales.

FIG. 1 shows an embodiment of a dynamometric pedal 10. Pedal 10 comprises a central tube 12 assembled to freely rotate around an axle 14. Axle 14 is intended to be connected at one end to a pedal crank, not shown. The rotation axis of tube 12 is noted Δ.

Central tube 12 is connected, via a connecting member, not shown in FIG. 1, to a pedal body 16 comprising a first part 18 and a second part 20. Preferably, the connecting member is a part separate from central tube 12 and from pedal body 16. First part 18 of pedal body 16 comprises a frame 22 fastened to a central part 24 by screws 26, two screws 26 being shown in FIG. 1. Central tube 12 extends between central part 24 and second part 20 of pedal body 16, frame 22 being open on one side to enable the passage of axle 14. Second part 20 of pedal body 16 is fastened to central part 24 via screws 28, two screws 28 being shown in FIG. 1.

First and second parts 18, 20 of pedal body 16 are, for example, made of aluminum, of steel, or of a plastic material possibly reinforced with fillers. As an example, frame 22 is contained within a parallelepiped having a large side measuring a few centimeters, for example, from 5 cm to 15 cm, having a small side measuring a few centimeters, for example, from 5 cm to 10 cm, and having a thickness from 1 cm to 3 cm.

Central portion 24 comprises an external surface 30. Second portion 20 of pedal body 16 comprises an external surface 32, substantially parallel to external surface 30. A coating, not shown, may be provided around the first and second parts 18, 20 of pedal body 16. As an example, a device enabling to automatically fasten a cyclist's shoe against the pedal by means of a positioning wedge permanently fastened under the shoe and cooperating with a fixed front clamp and a tiltably-assembled pre-stressed rear clamp may be provided on one of external surfaces 30, 32.

Figure 2:
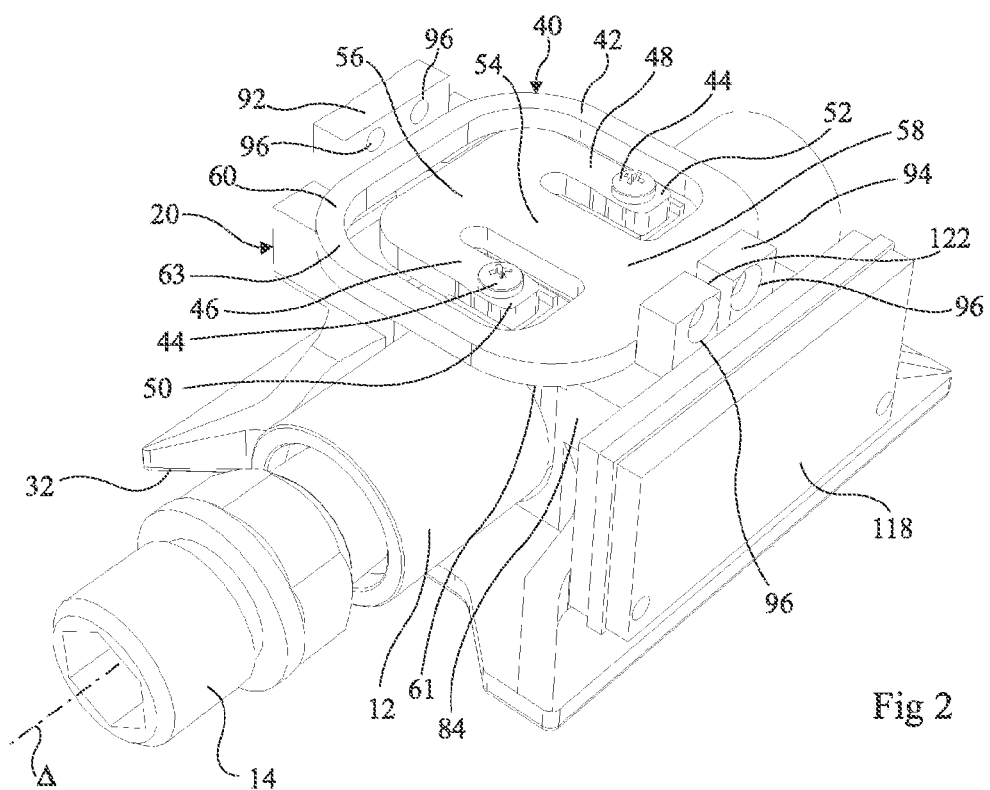
FIGS. 2 to 4 are perspective views of certain parts of the dynamometric pedal of FIG. 1.

FIG. 2 is a view similar to FIG. 1, where first part 18 of pedal body 16 is not shown. Effort sensor 40 comprises a proof body 42 which corresponds to the connecting member connecting crank body 16 to central tube 10. According to an embodiment, connecting member 42 is fastened to central tube 12, for example, by two screws 44. At least one deformation gauge, not shown in FIG. 2, is fastened to connecting member 42. Connecting member 42 may be made of steel or of another metal or metal alloy.

In the present embodiment, connecting member 42 has a structure symmetrical with respect to a plane perpendicular to rotation axis Δ. Connecting member 42 comprises two parallel lateral legs 46, 48, each connected to central tube 12 at one end 50, 52 by one of screws 44. Preferably, the shaft of each screw 44 cuts axis D. The distance between the shafts of screws 44 is in the range from 10 mm to 20 mm. Connecting member 42 comprises a central leg 54, connected at one end 56 to lateral legs 46, 48, and extending between lateral legs 46, 48, parallel thereto. Tabs 46, 48, 54 extend substantially perpendicularly to rotation axis Δ. In the absence of efforts exerted by the cyclist on the pedal, tab 54 extends substantially along a plane parallel to rotation axis Δ and parallel to surfaces 30, 32. Central leg 54 is connected, at opposite end 58, to a peripheral ring-shaped portion surrounding lateral legs 46, 48. Ring-shaped portion 60 comprises a planar surface 61 directed towards central tube 12 and a planar surface 63 directed towards central part 24.

The thickness of connecting member 42 is in the range from 1 mm to 4 mm. Ring-shaped portion 60 is inscribed within a square having a side length in the range from 2.5 cm to 5 cm. The width of central leg 54, measured parallel to rotation axis Δ, is in the range from 0.5 cm to 1.5 cm. Central part 24 comprises two openings 65 providing access to screws 44.

Figure 3:
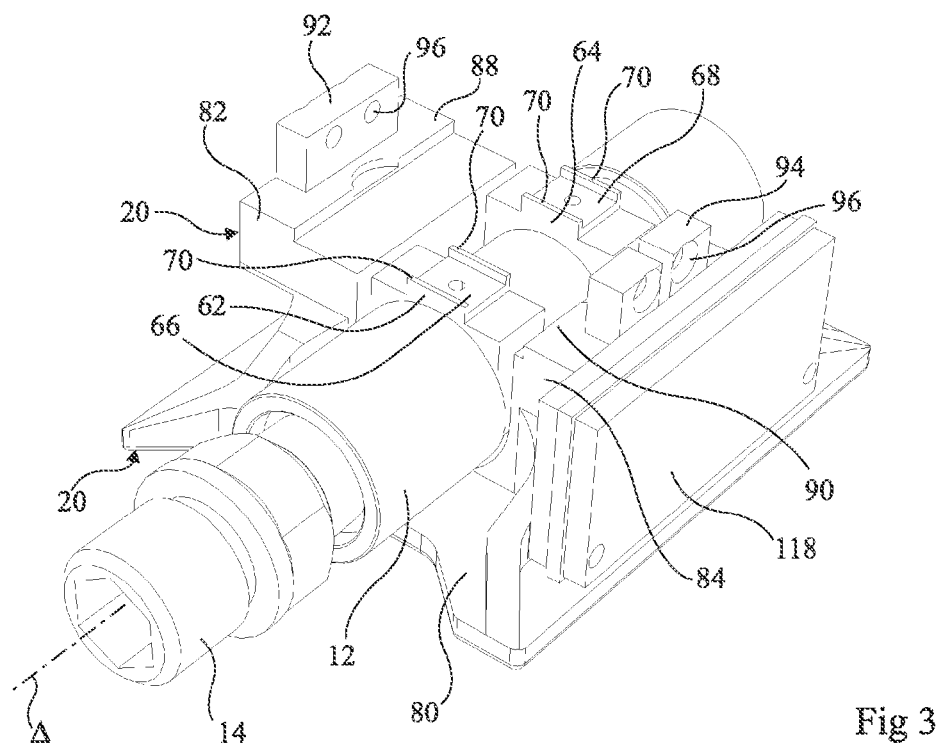

FIG. 3 is a view similar to FIG. 2, where effort sensor 40 is not shown. Central tube 12 comprises two pads 62, 64. Each pad 62, 64 comprises a planar pressing area 66, 68, substantially parallel to rotation axis Δ. Ends 50, 52 of lateral legs 46, 48 rest on pressing areas 66, 68. Preferably, each pressing area 66, 68 is symmetrical with respect to a plane containing rotation axis Δ. Connecting member 42 is in contact with central tube 12 only at the level of pressing areas 66, 68. Each pressing area 66, 68 is delimited by edges 70 along the sides perpendicular to rotation axis Δ. The spacing between edges 70 of pressing area 66 and between edges 70 of pressing area 68 is strictly greater than the width of tabs 46, 48 of connecting member 42. Edges 70 form stops which prevent the displacement of sensor 40 along a direction parallel to rotation axis Δ.

Connecting member 42 may have a shape different from that previously described in relation with FIG. 2. However, it is advantageous for each contact region between the connecting member and central tube 12 to be symmetrical with respect to a plane containing rotation axis Δ. It is further advantageous for the contact regions between the connecting member and central tube 12 to be applied parallel to rotation axis Δ.

Figure 4:
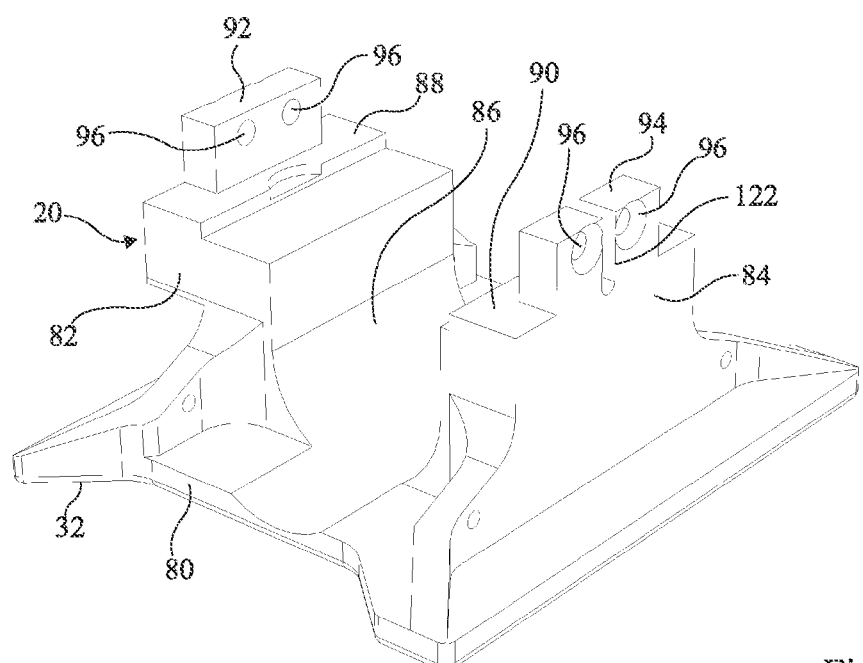
Figure 5:
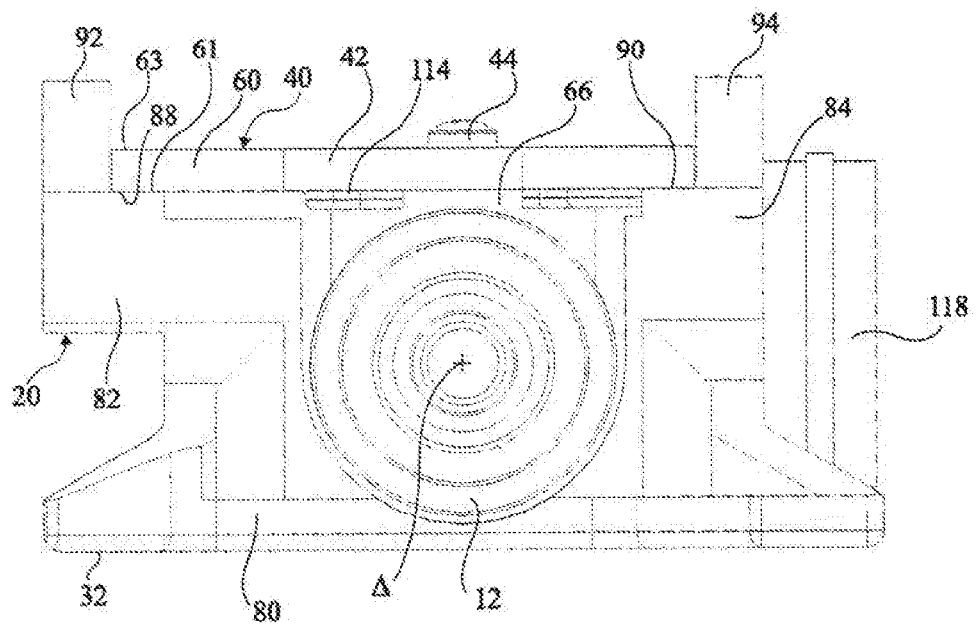
FIG. 5 is a side view of certain parts of the dynamometric pedal.

FIG. 4 is a view similar to FIG. 3, only lower part 20 of pedal body 10 being shown, and FIG. 5 is a side view of lower part 20 of pedal body 10, of central tube 12, and of effort sensor 40.

Lower part 20 of pedal body 16 comprises a base 80 and two flanges 82, 84 projecting from base 80. The two flanges 82, 84 and base 80 delimit a housing 86 having central tube 12 arranged therein. External planar surface 32 is formed on base 80 on the side opposite to central tube 12. Each flange 82, 84 comprises a planar pressing region 88, 90 parallel to rotation axis Δ. Pressing regions 88, 90 are coplanar and are capable of pressing against two portions of ring-shaped portion 60 of connecting member 42 located on either side of pads 62, 64 according to the efforts exerted by the cyclist on pedal body 16.

A fastening stud 92, 94 is provided at the top of each flange 82, 84. Each fastening stud 92, 94 is crossed by openings 96 for the passage of screws 26, shown in FIG. 1. The spacing between pads 92, 94 is strictly greater than the dimensions of ring-shaped portion 60 of connecting member 42. Fastening studs 92, 94 form stops preventing the relative displacement between effort sensor 40 and pedal body 16 along a direction parallel to pressing regions 88, 90 and perpendicular to rotation axis Δ. However, in normal operating conditions, it is possible for studs 92, 94 not to be in contact with connecting member 42.

Figure 6:
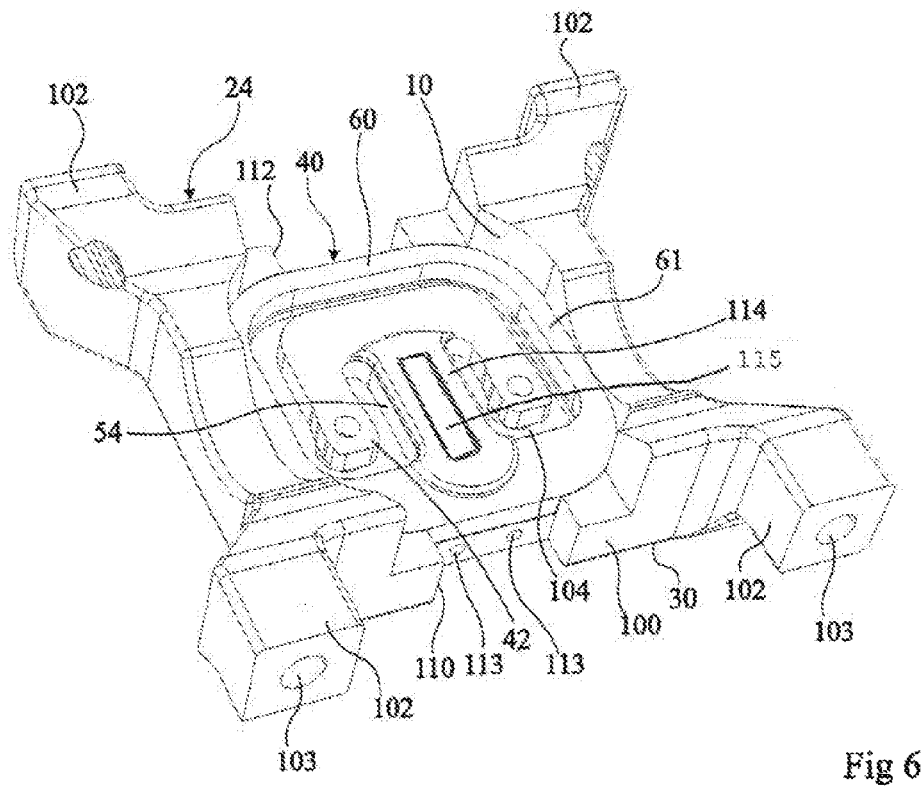
FIGS. 6 and 7 are perspective views of certain parts of the dynamometric pedal along a viewing direction substantially opposite to the viewing direction of FIG. 1.
Figure 7:
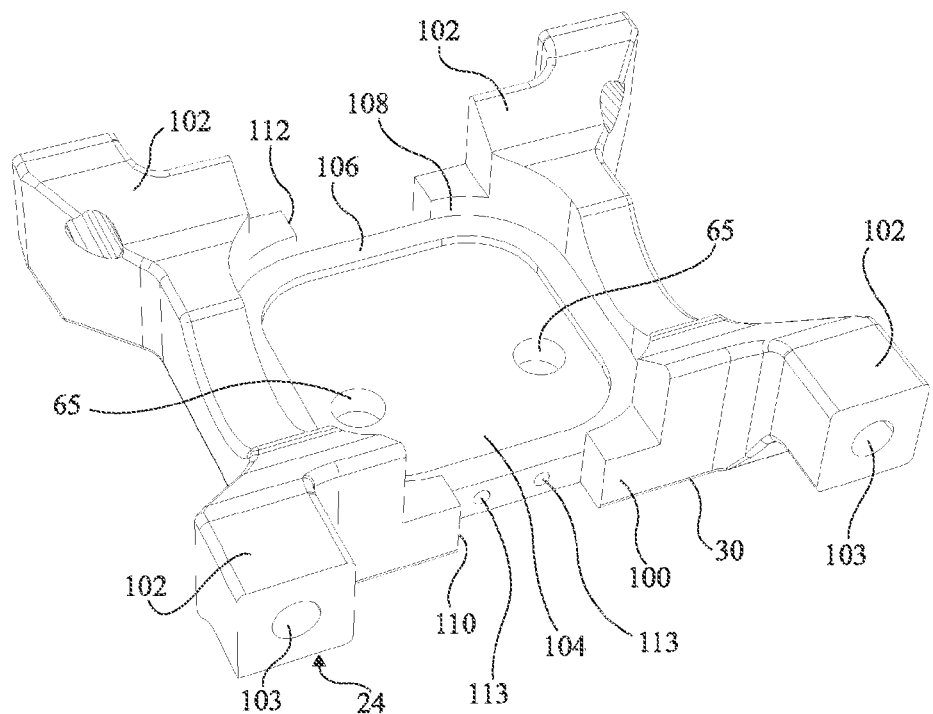

FIGS. 6 and 7 are perspective views respectively of central part 24 and of effort sensor 40 and of central part 24 alone. Central part 24 comprises a portion 100 forming a cover for protecting effort sensor 40 and which delimits surface 30. Cover portion 100 extends in four legs 102 intended to be fastened to frame 22. Legs 102 comprise openings 103 for the passage of screws 26. Cover portion 100 delimits a housing 104 receiving effort sensor 40. Cover portion 100 comprises a planar pressing region 106 substantially parallel to rotation axis Δ. Pressing region 106 is substantially parallel to pressing region 88, 90. Pressing region 106 is capable of pressing against ring-shaped portion 60 of connecting member 42 according to the efforts exerted by the cyclist on pedal body 16. Housing 104 is particularly delimited by a lateral wall 108 which forms a stop preventing the relative displacement between effort sensor 40 and central part 24 parallel to pressing region 106. However, in normal operating conditions, it is possible for lateral wall 108 not to be in contact with connecting member 42.

Cover portion 100 comprises two openings 110, 112 receiving pads 92, 94 for fastening central part 24 to lower part 20 of pedal body 16. Openings 113 for receiving screws 28 are provided at the level of openings 110, 112. When central part 24 is fastened to lower part 20 of pedal body 16, the distance, measured along a direction perpendicular to pressing regions 88, 90 and to pressing region 106, is strictly greater than the thickness of connecting member 42.

Connecting member 42 of effort sensor 40 is fitted with at least one deformation gauge 115 (FIG. 6). FIGS. 5 and 6 show an area of glue 114, particularly cyanoacrylate glue, covering central leg 54 of connecting member 42 on the side of central tube 12 and enabling to fasten at least one deformation gauge, 115 to central leg 54.

According to an embodiment, the deformation gauge is capable of reflecting the deformation of central leg 54 of connecting member 42 into an electric resistance variation. Preferably, the resistance strain gauge is arranged to detect a deformation of central leg 54 along a longitudinal direction, that is, substantially from end 56 to end 58. As a variation, a plurality of strain gauges are arranged on central leg 54 along different directions.

The relative variation of the resistance of the deformation gauge is proportional, to within the gauge factor, to the relative length variation of the gauge, and thus also to the relative length variation of the portion of connecting member 42 which supports the deformation gauge. Advantageously, a gauge having a high gauge factor is selected, to obtain a signal of greater amplitude and thus improve the sensitivity of sensor 40.

Figure 8:
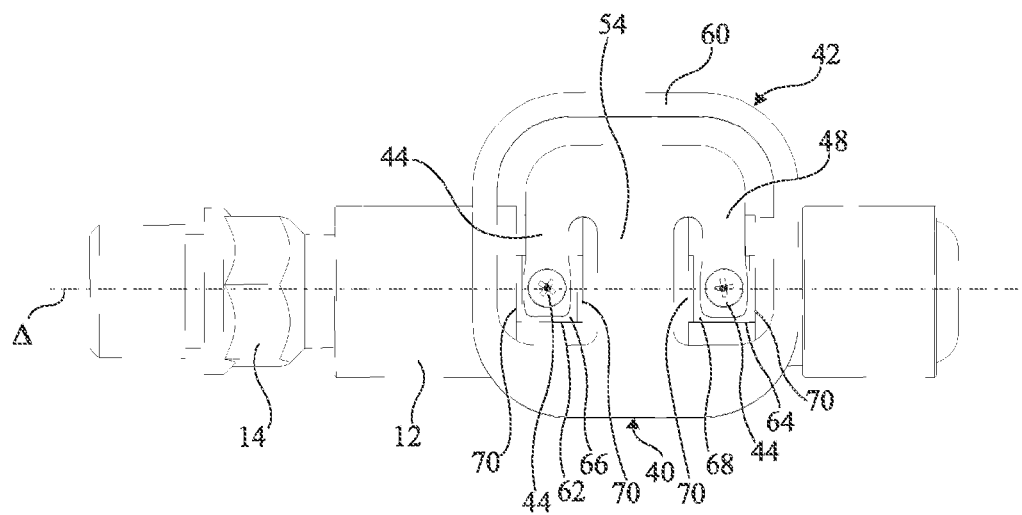
FIG. 8 is a top view of certain parts of the dynamometric pedal.

FIG. 8 shows a top view of central tube 12, of axle 14, and of effort sensor 40. As shown in this drawing, pressing regions 66, 68 are substantially aligned parallel to rotation axis Δ.

Figure 9:
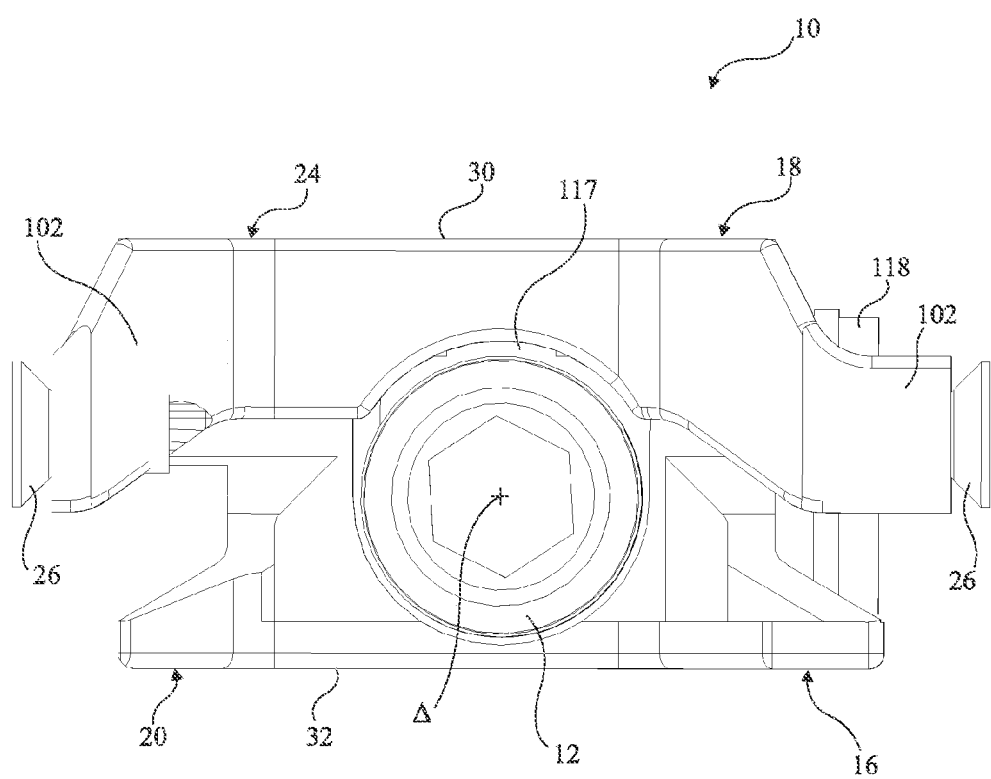
FIG. 9 is a side view of certain parts of the dynamometric pedal.

FIG. 9 shows a side view of dynamometric pedal 10, where frame 22 of upper part 18 of the pedal body is not shown. An interstice 117 is provided between central tube 12 and upper and lower parts 18, 20 of the pedal body. In normal operating conditions, upper and lower parts 18, 20 are not in direct contact with central tube 12 and the transmission to central tube 12 of all the efforts applied by the cyclist on upper part 18 or on lower part 20 is performed via effort sensor 40. The dimensions of interstice 117 are determined to maintain the operation of effort sensor 40 within a linear operating range. When the efforts applied to pedal body 16 are too strong, upper part 18 or lower part 20 comes in direct contact with central tube 12, which enables to protect effort sensor 40.

When the cyclist presses on surface 30 of upper part 18 of the pedal body, central part 24 presses against connecting member 42 of effort sensor 40. More specifically, pressing region 106 presses against surface 63 of ring-shaped portion 60 of connecting member 42. The efforts exerted by the cyclist are transmitted by connecting member 42 to central tube 12. Central leg 54 of connecting member 42 is deformed by flexion, this deformation being measured by the deformation gauge. When the cyclist presses on surface 32 of lower part 20 of the pedal body, said pedal presses against connecting member 42 of effort sensor 40. More specifically, pressing regions 88, 90 press against surface 61 of ring-shaped portion 60. The efforts exerted by the cyclist are transmitted by connecting member 42 to central tube 12. Central leg 54 of connecting member 42 is deformed by flexion, which deformation is measured by the deformation gauge.

Advantageously, since pressing regions 66, 68 are substantially parallel to rotation axis Δ and substantially aligned along rotation axis Δ, most of the efforts, preferably at least 90% of the efforts, transmitted by connecting member 42 to central tube 12 are perpendicular to rotation axis Δ and cut rotation axis Δ.

According to an embodiment, effort sensor 40 comprises a single deformation gauge. According to another embodiment, effort sensor 40 comprises a plurality of deformation gauges. Such deformation gauges may be arranged on the connecting member to measure deformations of opposite signs, for example, by arranging a deformation gauge on the surface of central leg 54 directed towards central tube 12 and by arranging the other deformation gauge on the surface of central leg 54 directed towards central part 24. This enables to perform a differential measurement and to suppress errors due, for example, to temperature.

The signals provided by the deformation gauge(s) are transmitted to a processing circuit 118, which is schematically shown as a package on the different drawings. Processing circuit 118 is arranged in a housing 120 provided between flange 84 of lower part 20, the two legs 102 of upper part 18 and frame 22. As an example, a slot 122 is provided in fastening pad 94 to enable the passage of wires, not shown, between the deformation gauges of sensor 40 and processing circuit 118. Further, an opening 124 is provided between central part 24 and frame 22 to provide an access to processing circuit 118. Processing circuit 118 may be powered by a cell or an electric generator capable of recovering the energy of the pedal rotation around rotation axis Δ, for example, via an electromagnetic, piezoelectric, or electrostatic conversion.

According to an embodiment, processing circuit 118 may comprise a housing open towards the outside for receiving a removable memory support in the form of a memory board which may be inserted through the opening. Processing circuit 118 is capable of digitizing the signals provided by the deformation gauge(s) and of storing the digitized data. After the cycle has been used, the removable memory board may be removed to be connected to a data processing and display unit (not shown) capable of disclosing the test results. According to another embodiment, processing circuit 118 may comprise remote signal transmission means.

The measured data may be transmitted to a display system, for example, a cell phone, to inform the cyclist of its pedaling rate, the developed output power, the energy delivered for a determined time period, etc. The data may be transmitted to an electric assistance system to adjust in real time the accompanying power delivered by the electric assistance system.

According to an embodiment, the pedal further comprises a sensor of the inclination angle of pedal body 16 relative to axle 14. It may be an angle coder integrated in the pedal body. According to another embodiment, dynamometric pedal 10 may further comprises at least one accelerometer.

The efforts determined from the signals delivered by effort sensor 40 correspond to the efforts perpendicular to surfaces 30, 32 of pedal body 16. To determine the rotation drive torque of the bicycle crank, the efforts tangential to the circle centered on the bottom bracket axle and following the rotation axis of the pedal should be determined. This may be achieved from the determination of the pedal inclination angle. This angle can be determined from the variation of the pedal acceleration measured by the accelerometer. The average tangential component of the force exerted by the cyclist, and thus the average torque during a turn of the crank gear crank, can thus be determined. The measurement of the acceleration further enables to determine the crank rotation speed. The average power delivered by the cyclist for one crank revolution can thus be determined. The determination of the rotation drive torque of the bicycle crank and of the output power delivered by the cyclist may be obtained as described in patent application WO2012/038677.

Connecting member 42 may be inscribed within a parallelepiped having its base corresponding to a square having a side length greater than a few centimeters. This advantageously enables to use efforts sensors available for sale and used, for example, in bathroom scales. Such effort sensors are manufactured in very large series and are very robust due to the experience feedback, particularly by optimization of the sensor shape and optimization of the means for gluing the deformation gauge to the connecting member.

The efforts applied by the cyclist are advantageously measured independently from the surface of pedal body 16 which is pressed by the cyclist.

The mechanical connection between upper part 18 of the pedal body and connecting member 42 and between lower part 20 of the pedal body and connecting member 42 is a connection by planar pressure and not a rigid mechanical connection. This advantageously enables to ensure that only pressure efforts are transmitted by pedal body 16 to effort sensor 40 and that flexion efforts are not transmitted by pedal body 16 to effort sensor 40. Thereby, effort sensor 40 only measures the force applied by the cyclist which is perpendicular to rotation axis Δ.

The fact for each pressing region 66, 68 to be symmetrical with respect to a plane containing rotation axis · results in that the efforts transmitted by connecting member 42 to central tube 12 are advantageously substantially perpendicular to rotation axis Δ. The inventors have shown that more than 90% of the efforts transmitted by connecting member 42 to central tube 12 are perpendicular to rotation axis Δ.

Ring-shaped portion 60 of connecting member 42 is inscribed within a square having a side length of a few centimeters. This distance of the pressing areas between pedal body 16 and connecting member 42 advantageously enables to obtain a proper transmission of the efforts from pedal body 16 to connecting member 42 even when the cyclist presses on pedal body 16 on the external side most remote from the crank or on the inner side closest to the crank.

Advantageously, each pedal of the cycle may be fitted with an effort sensor, as previously described. This enables to determine the efforts separately made by each of the cyclist's legs.

All the stress measurements means are advantageously embarked in the pedal to allow a data acquisition with no wire connection towards the outside of the pedal, which enables to fully measure the force applied against the pedal in normal condition of use and with no wire disturbing the motion.

Specific embodiments have been described. Various alterations and modifications will occur to those skilled in the art. Although an embodiment where frame 22 is fastened to central part 24 by screws 26 has been described, frame 22 may be fastened to central part 24 by any fastening means, for example by welding or by gluing. Further, frame 22 and central part 24 may form a monolithic part. Further, although an embodiment where lower part 20 of the pedal body is fastened to upper part 18 of the pedal body by screws 28 has been described, lower part 20 may be fastened to upper part 18 by any fastening means, for example, by welding or by gluing. Further, although an embodiment where connecting member 42 is fastened to central tube 12 by screws 44 has been described, connecting member 42 may be fastened to central tube 12 by any fastening means, for example, by welding or by gluing. Further, although an embodiment where a single connecting member 42 is used has been described, a plurality of connecting members 42 may be placed between central tube 12 and pedal body 16.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A bicycle pedal comprising a central tube, assembled to freely rotate around an axis, and a pedal body comprising at least a first surface on which a cyclist is capable of exerting an effort, the pedal body being connected to the central tube by at least a first connecting member comprising a first portion interposed between the central tube and the first surface and fitted with at least one deformation gauge, wherein the pedal body comprises a first part and a second part, fastened to the first part, the central tube being arranged between the first and second parts, the first and second parts being separated from the central tube by an interstice, the pedal body not being in direct contact with the central tube, and wherein the first connecting member is connected to the central tube by at least one screw having its shaft crossing the rotation axis of the central tube.

2. The pedal of claim 1, wherein the first portion extends, at rest, parallel to the first surface.

3. The pedal of claim 1, wherein the first connecting member is in contact with the central tube along a first pressing area symmetrical with respect to a plane containing the rotation axis of the central tube.

4. The pedal of claim 3, wherein the first connecting member is in contact with the central tube along a second pressing area symmetrical with respect to a plane containing the rotation axis of the central tube, the first and second pressing areas being aligned parallel to the rotation axis.

5. The pedal of claim 1, wherein the first part comprises a first planar region and wherein the first connecting member comprises a second planar region, the first planar region being in planar contact against the second planar region.

6. The pedal of claim 5, wherein the pedal body comprises a second surface parallel to the first surface, wherein the second part comprises a third planar region and wherein the first connecting member comprises a fourth planar region, the third planar region being capable of coming into planar contact against the fourth planar region.

7. The pedal of claim 1, wherein the first part comprises a central part and a frame, the frame at least partially surrounding the second part, the second part being fastened to the central part.

8. The pedal of claim 7, wherein the central part and the frame belong to a monolithic part.

9. The pedal of claim 1, wherein the first connecting member comprises a ring-shaped second portion surrounding the first portion and connected to a first end of the first portion.

10. The pedal of claim 9, wherein the first connecting member comprises third and fourth portions parallel to the first portion and connected to a second end of the first portion opposite to the first end, the first portion extending between the third and fourth portions, the third and fourth portions being fastened to the central tube.

11. The pedal of claim 1, further comprising at least a second connecting member, the second connecting member comprising a first portion fitted with at least one deformation gauge extending, at rest, parallel to the first surface, the first and second connecting members being aligned along an axis parallel to the rotation axis.

12. The pedal of claim 1, comprising a data processing circuit capable of receiving signals delivered by said deformation gauge.

13. The pedal of claim 1, comprising means for measuring at least one acceleration of the pedal.

14. The pedal of claim 1, comprising means for measuring the inclination angle of said first surface.

15. A bicycle pedal comprising a central tube, assembled to freely rotate around an axis, and a pedal body comprising at least a first surface on which a cyclist is capable of exerting an effort, the pedal body being connected to the central tube by at least a first connecting member comprising a first portion interposed between the central tube and the first surface and fitted with at least one deformation gauge, wherein the pedal body comprises a first part and a second part, fastened to the first part, the central tube being arranged between the first and second parts, the first and second parts being separated from the central tube by an interstice, the pedal body not being in direct contact with the central tube, and wherein the first connecting member comprises a ring-shaped second portion surrounding the first portion and connected to a first end of the first portion.

16. The pedal of claim 15, wherein the first portion extends, at rest, parallel to the first surface.

17. The pedal of claim 15, wherein the first connecting member is in contact with the central tube along a first pressing area symmetrical with respect to a plane containing the rotation axis of the central tube.

18. The pedal of claim 17, wherein the first connecting member is in contact with the central tube along a second pressing area symmetrical with respect to a plane containing the rotation axis of the central tube, the first and second pressing areas being aligned parallel to the rotation axis.

19. The pedal of claim 15, wherein the first part comprises a first planar region and wherein the first connecting member comprises a second planar region, the first planar region being in planar contact against the second planar region.

20. The pedal of claim 19, wherein the pedal body comprises a second surface parallel to the first surface, wherein the second part comprises a third planar region and wherein the first connecting member comprises a fourth planar region, the third planar region being capable of coming into planar contact against the fourth planar region.

21. The pedal of claim 15, wherein the first part comprises a central part and a frame, the frame at least partially surrounding the second part, the second part being fastened to the central part.

22. The pedal of claim 21, wherein the central part and the frame belong to a monolithic part.

23. The pedal of claim 15, further comprising at least a second connecting member, the second connecting member comprising a first portion fitted with at least one deformation gauge extending, at rest, parallel to the first surface, the first and second connecting members being aligned along an axis parallel to the rotation axis.

24. The pedal of claim 15, wherein the first connecting member comprises third and fourth portions parallel to the first portion and connected to a second end of the first portion opposite to the first end, the first portion extending between the third and fourth portions, the third and fourth portions being fastened to the central tube.

25. The pedal of claim 15, comprising a data processing circuit capable of receiving signals delivered by said deformation gauge.

26. The pedal of claim 15, comprising means for measuring at least one acceleration of the pedal.

27. The pedal of claim 15, comprising means for measuring the inclination angle of said first surface.

* * * * *